United States Patent [19]

Shank, Jr.

[11] 3,894,630

[45] *July 15, 1975

[54] CHUCK APPARATUS FOR SUPPORTING CONTAINERS BY THE FINISH PORTION THEREOF

[75] Inventor: Herbert C. Shank, Jr., Lancaster, Ohio

[73] Assignee: Anchor Hocking Corporation, Lancaster, Ohio

[*] Notice: The portion of the term of this patent subsequent to Feb. 4, 1992, has been disclaimed.

[22] Filed: Oct. 12, 1973

[21] Appl. No.: 405,778

Related U.S. Application Data

[63] Continuation-in-part of Ser. No. 358,864, May 10, 1973, Pat. No. 3,863,753.

[52] U.S. Cl. .......... 198/179; 198/22 B; 214/1 BA; 279/37; 294/106; 294/116
[51] Int. Cl.² .................. B65G 17/12; B65G 17/20
[58] Field of Search..... 198/179, 131, 22 B, DIG. 8; 294/86 R, 87 R, 106, 115, 116; 279/37; 214/1 BA, 309

[56] References Cited
UNITED STATES PATENTS

| 938,534 | 11/1909 | Whitney | 279/37 |
|---|---|---|---|
| 1,159,146 | 11/1915 | Wood | 279/46 |
| 1,738,803 | 12/1929 | Stiansen | 53/306 |
| 2,210,187 | 8/1940 | Ross | 118/500 |
| 2,600,161 | 6/1952 | Fouse | 118/500 |
| 3,240,520 | 3/1966 | Dailey et al | 279/37 |
| 3,684,078 | 8/1972 | Nielsen | 198/33 AB |
| 3,777,875 | 12/1973 | Sobran | 198/179 |

FOREIGN PATENTS OR APPLICATIONS

| 250,192 | 12/1926 | United Kingdom | 198/22 |

*Primary Examiner*—Evon C. Blunk
*Assistant Examiner*—Jeffrey V. Nase
*Attorney, Agent, or Firm*—Wood, Herron & Evans

[57] ABSTRACT

Apparatus for supporting a container in a vertical position by the finish portion thereof, includes a plurality of chuck jaws pivotally movable between an outwardly spread open position and a radially inward closed position wherein the jaws substantially completely enclose the container finish and support the container by it. The jaws are movable to the closed position by virtue of the fact that their centers of gravity are disposed radially outwardly of a central pivot. A vertically movable annular sleeve is adapted to engage and surround the jaws to positively hold them closed. The jaws are hung on pivots and, when the sleeve is moved out of engagement from them, they can be urged open by a direct acting cam or by tilting of the chucked container within the jaws in order to release the container. The chuck body which pivotally mounts the jaws is capable of receiving jaws of different shapes and sizes to hold similarly differing containers. Spinning apparatus is also provided for opening the jaws at a loading station.

21 Claims, 8 Drawing Figures

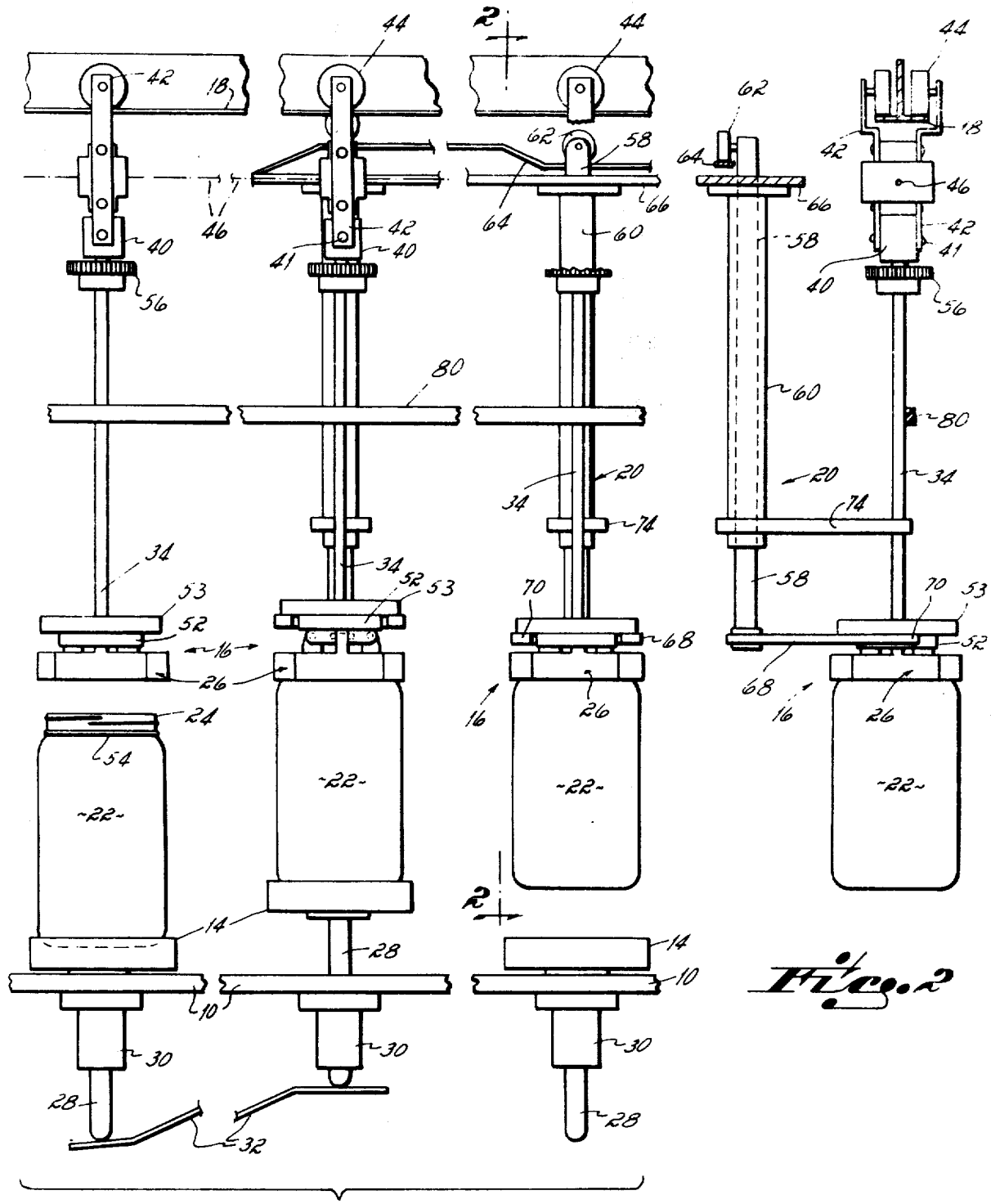

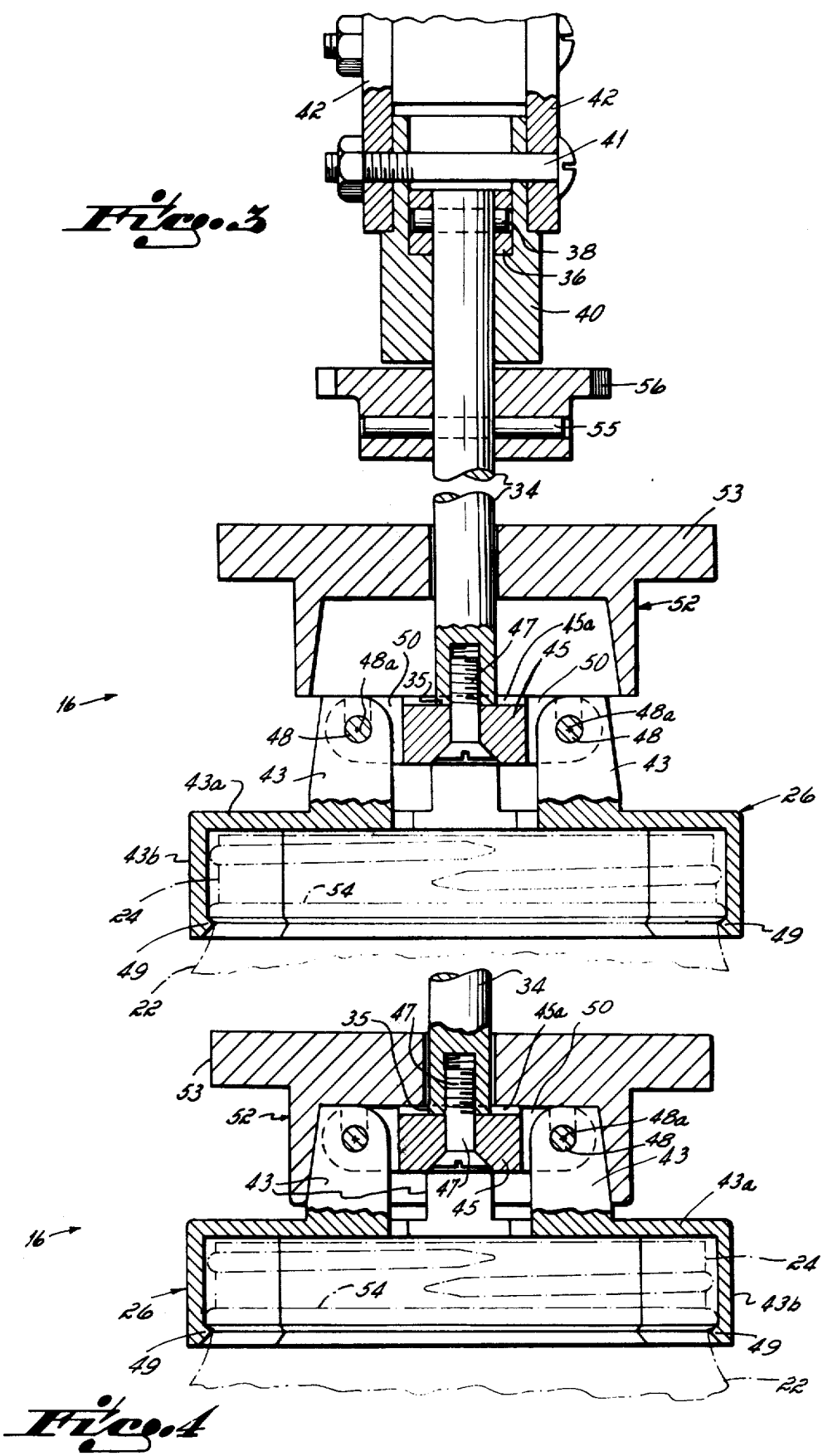

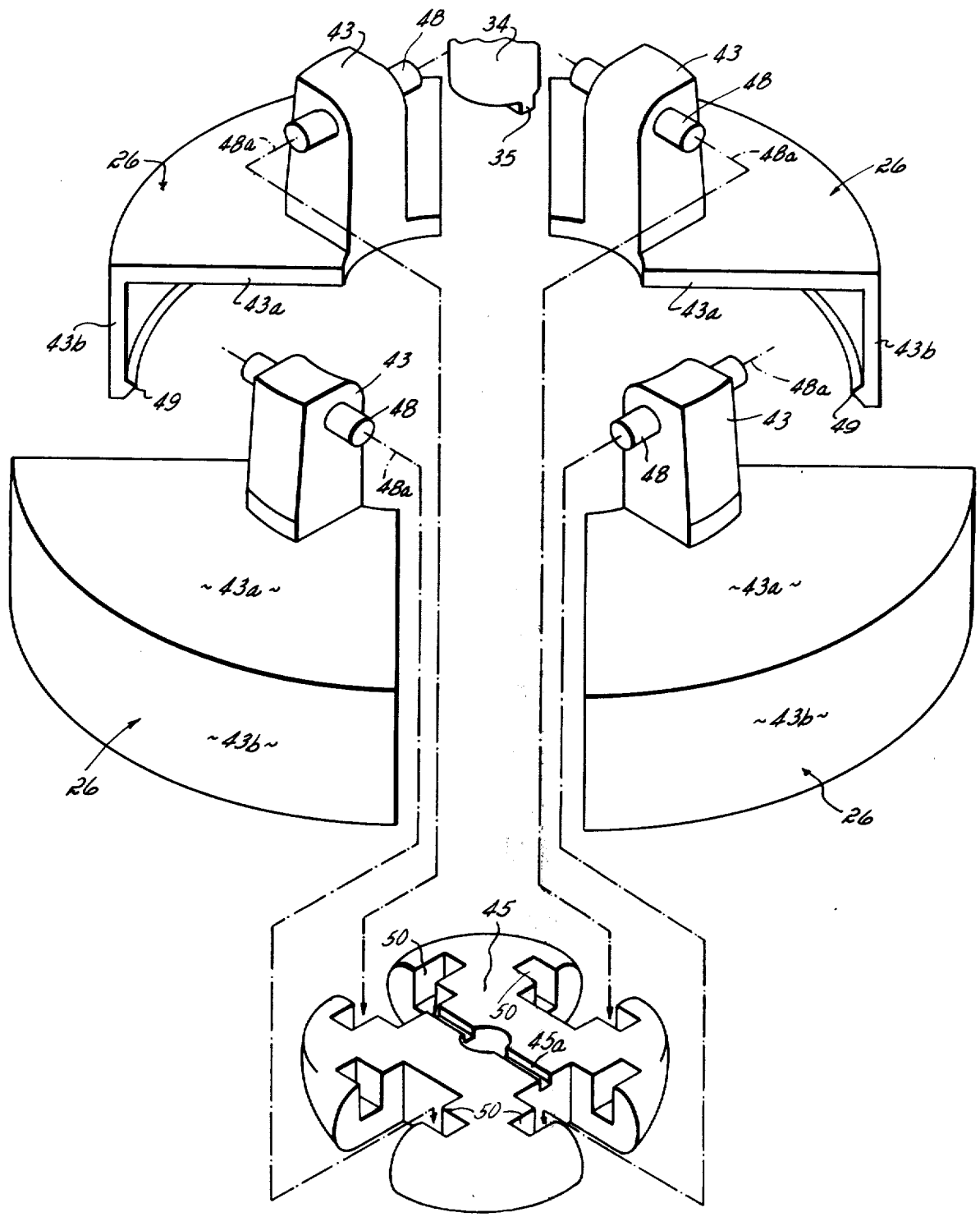

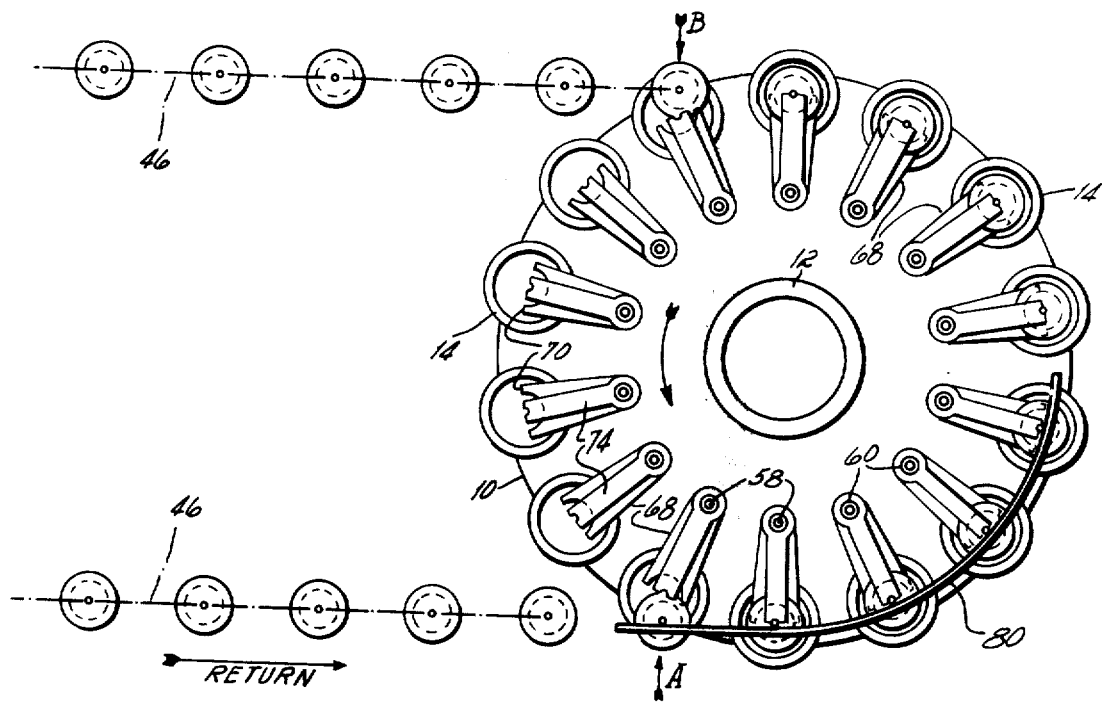
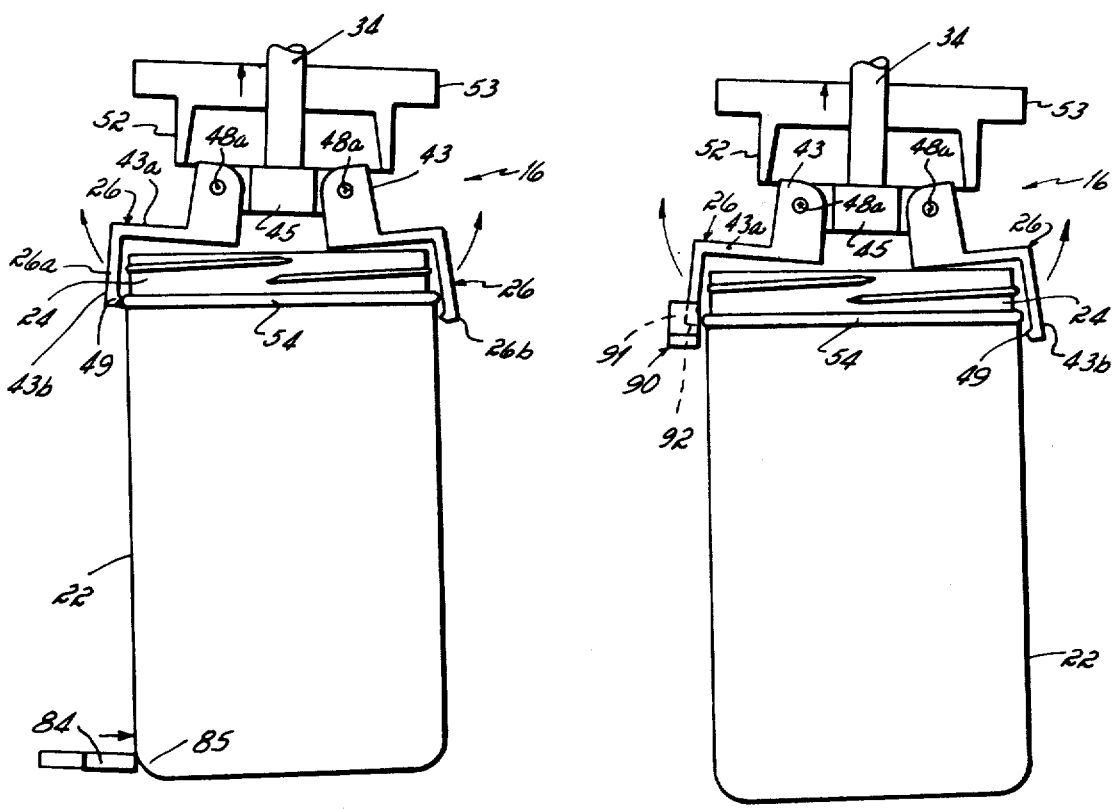

CHUCK APPARATUS FOR SUPPORTING CONTAINERS BY THE FINISH PORTION THEREOF

This application is a continuation-in-part of U.S. patent application Ser. No. 358,864 filed May 10, 1973, now U.S. Pat. No. 3,863,753, and entitled "Chuck Apparatus for Supporting Containers By The Finish Portion Thereof."

This invention relates to an improved chuck assembly for use in an automatic container manufacturing operation and, more particularly, to an improved chuck assembly for supporting containers in a vertical position by the finish or closure receiving portion thereof.

At various stages in the manufacture, inspection and processing of glass containers it may be necessary or desirable to carry each container by its finish. This is appropriate, by way of example, where a coating is to be applied to the body and base of the container. The presence of a belt or other carrier beneath the container would interfere with application of the coating, and of course, would block coating of the base.

It has become common practice to apply one or more coatings to glass articles moving in a continuous line, for example, to increase the abrasion and scratch resistance of the exterior surface of the articles. In such automated operations, the glass containers typically move on a continuous conveyor and are passed into a treatment area wherein they are sprayed with or otherwise exposed to a suitable coating material. In order for the containers to be commercially acceptable, the thickness of the coating must be uniform and controlled; and, furthermore, the coating must be prevented from contacting the finish portion of the container to prevent possible contamination of the interior thereof and/or to prevent possible corrosion of a metal ultimately to be placed on the finish portion.

It is known in the art to provide chucks to grip containers at the finish and to rotate them while they are moving linearly during a coating operation. For example, U.S. Pat. No. 3,060,057 discloses one such chuck design. However, there has been a need for a very simple, smooth-acting chuck comprised of a minimum of moving parts and which not only functions to support and suspend a container for coating but which also functions effectively to mask the finish during the coating operation.

Additionally it is desired to provide a universal chuck body capable of accepting jaws of different shapes and sizes for chucking container finish portions which vary in shape and size.

Accordingly, it is among the principal objects of this invention to provide an improved chuck assembly which is operative to support containers by the finish in a vertical position and to function as an effective finish mask during a subsequent coating operation.

A further principal object of the invention has been to provide a universal chuck body capable of accepting and mounting jaws which vary in size and shape to chuck similarly varying finish portions of containers.

A still further object of the invention is to provide chuck jaws capable of supporting the finish portion of a relatively wide-mouthed container such as the 100 millimeter wide finish portion of the typical glass mayonaise container.

A further object of the invention is to provide means for spinning container chucks in order to open the chuck jaws at desired stations.

In accordance with the preferred embodiment of the invention, these objects and others are accomplished by providing a chuck assembly comprising a chuck body, a plurality of chuck jaws mounted by the body and extending therebelow for pivotal movement between a spread apart open position and a radially inward closed position wherein the jaws cooperate to form a substantially closed annulus or mask about the finish portion, and a vertically movable annular sleeve operative to engage and cam the jaws from the open position to the closed position. The jaws include a lip portion adapted to engage the container finish in the closed position and to support the container thereby.

The jaws of the preferred embodiment are so designed that their respective centers of gravity or mass lie radially exteriorly of the pivotal axes of the jaws, whereby the jaws are biased by gravity to the closed position. When the sleeve is moved upwardly or out of engagement with the jaws, they are free to swing to the open position when engaged directly by a cam or when the chucked container is slightly tilted in order to release a container. The chuck assembly, excluding the jaws, is universal in that it can operatively mount other jaws such as the specific jaws described in my copending patent application Ser. No. 358,864 mentioned above. In combination with the chuck assembly is a lift means operative to move the annular sleeve into and out of engagement with the chuck jaws for loading and unloading of the jaws.

It is recognized that chucks having swingable jaws are known. In U.S. Pat. No. 54,990, there is disclosed a brace with a chuck having a circular ring that holds jaws inwardly on a body member, to retain a drill or bit. However, it has not been known, insofar as I am aware, to provide a chuck having jaws which are opened via an external direct acting cam or by tilting of a container chucked therein and which jaws also provide a mask to cover the end portion of the article that they grip.

Other objects and advantages of the invention will be apparent from the following detailed description, reference being had to the accompanying drawings, in which:

FIG. 1 is a fragmentary side elevational view of a preferred form of the chuck assembly in combination with a continuously moving conveyor and means for locking and unlocking the chuck jaws;

FIG. 2 is a vertical section taken along lines 2—2 of FIG. 1;

FIG. 3 is an enlarged fragmentary cross-sectional view of the chuck assembly in the open position;

FIG. 4 is a cross-sectional view of a portion of the chuck assembly in the closed position;

FIG. 5 is an exploded view of the chuck jaws and chuck body;

FIG. 6 is a top plan view of an automatic chuck loading system in combination with the chuck of this invention;

FIG. 7 is a diagrammatic view showing one means of releasing a chucked container; and FIG. 8 is a diagrammatic view showing another means by which a chucked container can be released from the jaws.

A chuck assembly in accordance with this invention is described hereinafter with particular reference to an automatic container coating system wherein the glass containers are sequentially loaded into a continuously moving line of chuck assemblies, carried through a coating operation, and then unloaded from the chucks, after which the empty chucks return to the loading station in a continuous operation.

Referring now to the drawings, and particularly to FIG. 1 and FIG. 6, by way of illustration such an automatic handling system comprises a continuously rotating table 10 mounted on a centrally disposed drive shaft 12 and including a plurality of individual container seats or trays 14 equally spaced about its circumference, a continuously moving line of chuck assemblies 16 suspended from and driven on an overhead track 18 in synchronization with the rotation of the table 10, and a plurality of chuck unlocking or lift mechanisms 20 mounted on the drive shaft 12 and radially aligned with the container trays 14. The system is designed such that the chuck assemblies 16 move tangentially or sideways into and out of the circumference of the rotating table 10 and travel an arcuate portion thereof in vertical axial alignment with the container trays 14. The table thus acts as a means for moving the lift mechanism into position for loading or unloading the chucks, as described hereinafter. The trays are shaped to provide a seat for the container base (see FIG. 1).

In operation, as will hereinafter be more fully explained in detail, the chuck assemblies 16 move continuously and sequentially into axial alignment above the container trays, as shown at point A of FIG. 6. With a container 22 seated therein, the tray 14 is moved upwardly. Simultaneously, by means of an associated lift mechanism shown generally at 20, the chuck assembly 16 is unlocked therefor to receive the container finish portion 24. While the table 10 rotates with the chuck assembly 16 moving in synchronization therewith, the chuck jaws 26 are closed and they grasp the container finish 24. The container tray 14 then returns to its lowered position, and the suspended containers 22 are carried tangentially from the loading table 10, as shown at point B of FIG. 6, toward the coating or other processing operation. After such processing, the containers are unloaded from the chuck jaws 26 in the reverse manner from which they were loaded, and the empty chuck assemblies 16 return to the loading table 10 in a continuous container handling operation.

The following detailed description will make the nature of the apparatus and the container handling operation more clear. Referring in addition to FIGS. 2, 3 and 4, the individual container trays 14 are mounted on vertically reciprocal rods or shafts 28, each of which extends through the loading table 10 and moves in a bushing 30 attached to the bottom surface thereof. As the table 10 rotates, the rods 28 sequentially contact and slide on a cam track 32 beneath the table 10 which raises the trays 14 and, consequently, the glass containers 22 seated therein to a position underneath the vertically aligned chuck assemblies 16. This carries the containers 22 into the chuck jaws 26, which are open to receive them. After loading, the rods 28 ride off the cam track 32 and the trays 14 fall to the lowered position, so that the containers are thereafter carried by the chucks.

The chuck assembly 16 comprises a spindle 34 carried by means which mount it vertically. Specifically, spindle 34 is mounted at its upper end in a bearing 36 by means of a pin 38 which in turn is mounted in a housing 40. Extending upwardly from the housing 40 and attached thereto by bolts 41 are a pair of brackets 42 which carry wheels 44 that ride on the overhead track 18. The chuck assembly 16 is driven by suitable means such as a cable 46 and moves in synchronization with the rotation of the table 10. At the lower end of the spindle 34 is attached a horizontally disposed chuck body 45. The chuck body is mounted to spindle 34 as by a screw 47, and is adapted to receive and support the individual chuck jaws 26.

The lower end of the spindle 34 is provided with an integral lug 35 and a slot 45a is cut into the top of the chuck body 45 to receive the lug 35 when the body is assembled to the spindle. The cooperation between the lug and slot serves to keep the body from spinning or unscrewing with respect to the spindle when the chuck is rotated as will be described.

As shown in FIG. 5, the integral chuck jaws 26 comprise an upwardly extending lobe portion 43, a portion 43a extending horizontally from a lower area of lobe 43, an arcuate portion 43b which extends vertically from portion 43a, and a lip portion 49 protruding interiorly of arcuate portion 43b. Pivot pins 48 are inserted through lobe portions 43. The chuck body 45 contains recesses 50 which receive the pins 48, whereby the jaws 26 are hingedly mounted on the chuck body 45. The jaws 26 extend below body 45 and are pivotal about the longitudinal axis 48a of the pins 48. The mounting allows for quick removal and replacement of chuck jaws, for example, to accommodate containers having different mouth sizes. The specific jaws disclosed herein are particularly adapted to grasp and "chuck" or support relatively large mouthed containers such as the 100 millimeter finish portions of the typical glass mayonaise container. It can be appreciated, however, that jaws in many various shapes and sizes can be utilized in the chuck body to render the chuck capable of handling containers having various shape and size finish portions.

As an example of the above, attention is directed to the disclosure in my previously mentioned U.S. patent application Ser. No. 358,864 disclosing jaws having upwardly extending lobes 51. These lobes are shaped similarly to the lobes 43 of the present disclosure and it can be appreciated that the jaws in this application and in my previous application are interchangeable within the chuck body 45 and recesses 50.

In this connection, it should be noted that while the containers to be treated may vary in size and shape, a treatment apparatus is capable of treating and coating even widely varying containers. Heretofore, and considering the known chucks available prior to my inventions, it would have been necessary to change the complete chuck assembly to handle containers having widely differing finish portions. The chuck assembly in this and in my aforementioned patent applications is universal and is adaptable to a widely varying selection of containers and finish portions by merely substituting the proper jaw into the chuck body. This substitution may be readily carried out merely by slipping the wrong sized jaws out and the correct jaws in. In this manner, a variety of containers can be treated with the same apparatus and the versatility provided is relatively inexpensive.

Vertically movable or shiftable on the spindle 34 is a flange 53 having an annular sleeve 52 below it which, when the flange is raised, is out of engagement with the jaws 26, but which when unrestrained drops and engages the jaws 26 thereby restraining them against pivoting about their pivot axes 48a in the closed position shown in FIG. 4. In the closed position, the lip portions 49 of the chuck jaws 26 engage a rib 54 on the container finish 24 whereby the container 22 is supported by the jaws 26 and is suspended from the lip portion 49 thereof. The annular sleeve 52 holds the jaws 26 inwardly.

Also mounted on the spindle 34 by means of a fixed pin 55 is a pinion gear 56 adapted to engage a rack (not shown) at the coating station whereby the spindle 34 and, consequently, the container 22, can be rotated about its vertical axis during the coating operation to allow for uniform coating of the exterior surface of the container 22.

In combination with the chuck assembly 16 is a lift assembly 20 comprising a shaft 58 vertically reciprocable within a concentric casing 60. Mounted at the upper end of the shaft 58 is a cam follower 62 which rides on an overhead cam track or support means 64 concentric with the table drive shaft 12. The casing 60 is rigidly fixed to the drive shaft 12 by means of a flange 66 and is radially aligned with the container trays 14 so as to move therewith.

At the respective opposite end of the lift shaft 58 is a horizontally disposed lift 68 which engages the annular flange 53 of the sleeve 52 as the chuck assembly 16 moves over the plane of the rotating table 10, for moving the sleeve 52 into and out of engagement with the chuck jaws 26. In the preferred embodiment, the lift 68 cmprises a fork having fingers 70 which are engageable around the annular sleeve 52 below the flange portion 53 thereof so that on upward movement of the vertically reciprocable lift shaft 58 the annular sleeve 52 is moved upwardly on the spindle 34 out of engagement with the chuck jaws 26.

Attached to the casing 60 is a second horizontal member 74 also of fork design adapted to engage the spindle 34 in the same manner as the lift means 68 engages the sleeve 52, to maintain the chuck assembly 16 in axial alignment with its respective container tray 14 during the loading operation.

The chuck jaws 26 are so mounted that they tend to remain in their closed position even when annular sleeve 52 is moved out of engagement therewith. That is, the jaws 26 are designed so that their center of gravity lies radially exteriorly of the pivotal axis 48a of the jaws 26 in the closed position.

Although the jaws of the chuck tend to remain closed when the constricting sleeve is lifted upwardly at the loading table station, only a very slight force is normally needed to open the jaws for reception of the finish portion of a container. In fact, since the lower area of the jaw lips 49 are beveled as shown, the upward motion of a container into the jaws may be generally sufficient to rotate the jaws about the axis 48a to an open position. Once the rib 54 of the finish portion has passed the apex of the lip, the jaws tend to swing shut, thereby capturing the rib and the container. The constricting sleeve 52 can then be lowered over the lobes 43 to lock or maintain the jaws in a closed position.

Since the jaws are used in a coating process, it has been found that residual amounts of coating material tend to adhere thereto and causes the jaws to stick. Should the jaws stick severely, a container may be broken up attempted insertion into the jaws. Even light sticking may cause the jaws to be reluctant to open by upward container pressure and thus may cause container scratching, cracking or other damage. While chuck cleaning processes are utilized to clean the chucks to prevent this sticking, an additional feature of the invention facilitates the opening of the jaws at the loading station for reception of a container.

As shown in FIG. 6 a length 80 of flexible friction material (such as rubber, polyurethane or any suitable material) is mounted by any suitable means and is positioned to lie a predetermined path of the spindles 34 as they are moved through the loading station. The flexible member 80 engages the spindle 34 above the chuck assembly 16 and below pinion gear 56 and causes the moving spindles to rotate as they pass through the loading station. A forward end of the length 80 is positioned to engage the spindles prior to the time when a container is urged upwardly into the jaws 26, and the consequent spinning of the chuck assembly causes the jaws 26 to pivot about axes 48a into an open position for container reception. After the container has been introduced into the jaws, spinning is no longer required and the member 80 is discontinued at a corresponding point in the spindle path. In this manner, jaw opening and container loading is facilitated and breakage, scratching or other finish damage is reduced.

An additional advantage to the member 80 is that it tends to hold the spindles 34 and chuck assemblies 16 in a nearly vertical position as they move through a circular path around the table. This assures alignment of the central vertical axes of the chuck and of the loading trays 14 and insures container alignment with the jaws 26. Without the radial restraint provided by the member 80, the chuck assemblies (at certain speeds) have been found to swing outwardly with respect to their desired circular alignment path. Of course, a rack disposed in a circular path could be provided to engage pinions 56 and spin the chucks, thereby obtaining the same advantages.

FIGS. 7 and 8 depict diagrammatically two means by which containers can be released from the jaws 26. A preferred means is indicated by FIG. 7 and contemplates a cushioned cam or buffer 84 positioned at a discharge point to engage a heel portion 85 of the container 22. As the container enters the discharge station, the sleeve 52 and flange 53 are lifted upwardly, leaving the jaws unrestrained. When the heel 85 engages the buffer, the container 22 is tilted and this rotates the offside jaw 26b and its respective axis 48a. This opening allows rib 54 to drop down past the apex of the lip 49 on the onside jaw 26a and the container is thereby released. The actual "rocking" of the container need be only a slight one in order to accomplish the release. This is due to the dimensions of the lip 49 and rib 54 as can be appreciated. Despite this, it can also be appreciated that while the container is captured within the jaws 26, the closed grasp of the chuck is a very secure one as the jaws substantially surround the finish 24. Of course, during release in the above manner, the jaw 26a and the other unrestrained jaws may also pivot slightly toward an open position due to the dropping container.

An alternate means for releasing a container is diagrammatically shown in FIG. 8. In this embodiment, a direct acting cam 90, having a sloping surface 91, is positioned in the path of a jaw 26 at a discharge station.

(Motion is perpendicular and toward the plane of FIG. 8 from the reader's viewpoint) Again, the sleeve 52 has been raised and the jaw is free to pivot about axis 48a when the cam 90 engages lower portion 92 of the jaw. This releases the container which may tilt and fall from the unrestrained jaws.

OPERATION

The individual containers 22 are either manually or automatically placed on the trays 14 carried on the rotating table 10. The chuck assemblies 16 approaching the table 10 are now in the closed position as a result of the annular sleeve 52 being lowered and engaging the jaws 26. As the chuck assembly 16 indexes above a container tray 14, the horizontal member 74 is carried into engagement with the spindle 34, the lift means 68 is carried into engagement with the annular flange 53, and the reciprocal shaft 28 attached to the container tray 14 begins to contact the cam track 32 thereby raising the container tray 14. The cam follower 62 attached to the vertically reciprocal lift shaft 58 of the lift mechanism 20 more or less simultaneously begins to ride up on the overhead cam track 64 thereby raising the horizontal lift means 68 and raising the annular sleeve 52 out of engagement with the chuck jaws 26. The chuck jaws 26 are thus free to swing open (upon spinning by means of member 80) and the container tray 14 reaches its raised position with the container finish portion 24 interposed between the open chuck jaws 26.

As the table 10 continues to rotate, the cam follower 62 then rides down the cam track 64 lowering the annular sleeve 52 into camming engagement with the chuck jaws 26 thereby camming and restraining them in the closed position. The chuck jaw lip portion 49 engages the rib 54 of the container finish 24. With the chuck jaws 26 now in their closed position, as shown in FIG. 4, the container tray 14 rides off its cam track 32 and falls to its lowered position whereby the container 22 is supported solely by the finish 24. The chuck assembly 16 with the container 22 suspended therefrom then exits the circumference of the rotating table, as shown at point B of FIG. 6, carrying the container 22 to the coating operation.

When the assembly reaches the coating operation, the pinion gear 56 may engage a rack (not shown) thereby turning the spindle 34 about its longitudinal axis and spinning the container 22 to allow for uniform coating thereof. After coating or other treatment, the chuck assembly 16 indexes into a discharge station which may comprise a second rotating table (not shown). The container 22 is unloaded from the chuck assembly in the reverse manner from which it was loaded and via a release means such as described in either FIGS. 7 or 8. That is, the spindle 34 and annular sleeve 52 index into the lift mechanism 20 and the annular sleeve 52 is raised out of engagement with the chuck jaws 26. As this occurs the chuck jaws 26 are free to swing open and release the container 22 which is now seated in a raised container tray 14. After unloading, the continuously moving line of chuck assemblies 16 returns by means of the track 18 to the loading table 10 where the process is repeated.

Although my invention has been described in terms of a certain preferred embodiment, it will be recognized by those skilled in the art that other forms may be adopted within the scope of my invention. For example, although my invention has been described in terms of a certain container handling system, it is to be recognized that my invention may be easily adapted to different systems. Furthermore, although my invention has been described in terms of handling glass containers, it will be recognized that it is equally applicable to other containers, for example, plastic or metal containers or other particles.

What is claimed is:

1. Apparatus for supporting a container in a vertical position by a finish portion thereof comprising, in combination:
   a chuck assembly including,
   a spindle,
   means for mounting said spindle vertically,
   a chuck body carried by said spindle,
   a plurality of chuck jaws mounted by said body for pivotal movement about horizontal axes and extending therebelow, said jaws being pivotally movable between a radially outward open position and a radially inward closed position, said jaws being so shaped that when in said closed position in use they form a substantially closed mask about the finish portion of a container supported by the chuck assembly,
   an annular sleeve shiftable along said spindle and operative to engage and hold said jaws in said closed position,
   said jaws each including a lip portion adapted to engage said finish portion when in said closed position so that said jaws support said container thereby, and
   said jaws each being so mounted to said body and of such shape as to be biased by the force of gravity from said open position toward said closed position,
   means for shifting said sleeve along said spindle into and out of closing engagement with said jaws, and
   means for spinning said chuck body so that said jaws pivot outwardly toward said open position when said sleeve is out of engagement therewith.

2. The apparatus as in claim 1 wherein said means for shifting said sleeve into and out of closing engagement with said jaws comprises a lift assembly comprising,
   a vertically reciprocable shaft having a fork attached thereto, said fork extending horizontally from said shaft and engageable with said annular sleeve to shift the latter along said spindle vertically with respect to said jaws, and means for shifting the shaft and fork vertically.

3. The apparatus of claim 1 wherein said vertically disposed spindle is mounted at an upper end for rotation in a housing and wherein said chuck body is attached to a lower end of said spindle.

4. The apparatus of claim 3 wherein said housing is mounted on a supporting elongated track to move said chuck assembly through a path and further comprising flexible means disposed at least partially in a portion of said path for engaging said spindle and for spinning said spindle, chuck body and jaws as the assembly is moved along said path.

5. The apparatus of claim 3 wherein said chuck body is attached to said spindle by a screw extending through said body into a lower end of said spindle and further including a lug on the lower end of said spindle and a slot in said chuck body receiving said lug and holding said chuck body against rotation with respect to said spindle in order to keep said chuck body from unscrewing from said spindle.

6. Apparatus for supporting a container in a vertical position by a finish portion thereof comprising, in combination:
- a chuck assembly including,
- a spindle,
- means for mounting said spindle vertically,
- a chuck body carried by said spindle and having a plurality of horizontally disposed recesses therein,
- a plurality of chuck jaws mounted by said body and extending therebelow,
- each of said jaws having a main body portion, an upwardly extending lobe portion, a pivot pin extending transversely through said lobe portion and adapted to seat in a respective one of said recesses, a bridging portion extending horizontally and radially outwardly from a lower area of said lobe portion, and an arcuate portion extending vertically downwardly from said bridging portion, said arcuate portion including a lip portion,
- said jaws being pivotally movable about the pivot axis of said pins between an open position and a radially inward closed position wherein said jaws form a substantially closed mask about the finish portion of a container supported by the chuck assembly,
- an annular sleeve shiftable along said spindle and operative to engage and hold said jaws in said closed position,
- said lip portion being adapted to engage said finish portion when in said closed position so that said jaws support said container thereby,
- said jaws being so mounted, with respect to their centers of mass, as to be biased by the force of gravity from said open position toward said closed position, and,
- means for shifting said sleeve along said spindle into and out of engagement with said jaws.

7. Apparatus as in claim 6 wherein said means for shifting said sleeve into and out of engagement with said jaws comprises a lift assembly comprising,
- a vertically reciprocal shaft having a fork attached thereto, said fork extending horizontally from said shaft and engageable with said annular sleeve to lift it vertically from engagement with said jaws, and,
- means for shifting the shaft and fork vertically.

8. Apparatus as in claim 7 including means to spin said chuck so that said jaws rotate toward an open position when said sleeve is out of engagement therewith.

9. Apparatus as in claim 6 including a track defining a predetermined fixed path and wherein said chuck assembly is mounted on said track to carry said container along said fixed path, and further including cam means for releasing a container from said jaws.

10. Apparatus as in claim 9 wherein said cam means includes a cam surface disposed within said predetermined path of said container to rock said container, when said sleeve does not engage said jaws, in order to release said container from said jaws.

11. Apparatus as in claim 9 wherein said cam means includes a cam surface adjacent said path and disposed to engage at least one of said jaws, when said container is at a predetermined point in said path, and when said sleeve does not engage said jaws in order to pivot said jaw and to release said container from said jaws.

12. Apparatus for supporting a container in a vertical position by a finish portion thereof comprising, in combination:
- a movable chuck assembly comprising,
- a vertically disposed spindle,
- a housing receiving and supporting an upper end of said spindle,
- a chuck body mounted at the lower end of said spindle,
- a plurality of chuck jaws mounted by said body and extending therebelow, said jaws being pivotally movable between a spread apart open position and a radially inward closed position, said jaws being shaped to form a substantially closed mask about the finish portion of a container carried by said jaws,
- an annular sleeve vertically shiftable along said spindle with respect to said body, said spindle holding said sleeve in alignment with said jaws for engaging and camming said jaws in said closed position,
- said jaws each including a lip portion adapted to engage said finish portion, when said jaws are in said closed position, and to support said container thereby, said jaws being so mounted as to be biased by the force of gravity from said open position to said closed position,
- a track defining a fixed predetermined path, said housing being movably mounted on said track,
- means for driving said housing and said chuck assembly along said track,
- a movable lift assembly adapted to move in synchronization with said chuck assembly over at least a portion of said path and comprising a shaft vertically reciprocal within a concentric casing,
- first fork means attached to said shaft, extending horizontally from said shaft, and engageable around said annular sleeve, said first fork means shiftable vertically with respect to said casing to move said sleeve into and out of engagement with said jaws,
- second fork means attached and extending horizontally from said casing and engageable around said spindle to maintain said lift assembly in synchronization with the movement of said chuck assembly, and means for driving said lift assembly.

13. Apparatus as in claim 12 including means to at least partially open said jaws when said sleeve is out of engagement therewith.

14. Apparatus as in claim 13 wherein said opening means includes means to spin said chuck assembly to cause said jaws to rotate toward an open position.

15. Apparatus for supporting a container in a vertical position by a finish portion thereof and for carrying a container throughout a predetermined path defined by a track, said apparatus including:
- a spindle,
- means for mounting a spindle vertically for movement along said track,
- a chuck body carried by said spindle,
- a plurality of chuck jaws mounted on said body and extending therebelow, said jaws being pivotally movable between a radially outward open position and a radially inward closed position, said jaws being so shaped that when in said closed position they form a substantially closed mask about the finish portion of a container supported thereby, an annular sleeve vertically shiftable along said spindle and operative to engage and hold said jaws in said closed position, said jaws each including a lip portion adapted to engage said finish portion when in said closed position and to support said container thereby, said jaws each being so mounted to said body as to be biased by the force of gravity from said open position toward said closed position, means for shifting said sleeve into and out of closing engagement with said jaws, and cam means at least adjacent said predetermined path for releasing said container from said jaws at a predetermined position.

16. Apparatus as in claim 15 wherein said cam means includes a cam surface disposed partially within said predetermined path for engaging a container, wherein said sleeve is out of engagement with said jaws, and for thereby rocking said container with respect to said jaws so as to release said container therefrom.

17. Apparatus as in claim 15 wherein said cam means includes a cam surface disposed to engage at least one of said jaws, when said container is moved through said path, to pivot said jaw toward an open position in order to release a container from said jaws.

18. Apparatus for supporting a container in a vertical position by a finish portion thereof comprising, in combination, a movable chuck assembly comprising, a rotatable vertically disposed spindle having an upper end and a lower end, a housing mounting said spindle at said upper end thereof, a chuck body mounted at the lower end of said spindle, said chuck body including a plurality of recesses therein, a plurality of vertically disposed chuck jaws mounted by said body, each of said jaws including a main body portion, a lip portion, an upwardly extending lobe portion, and a pivot pin having a horizontal axis and extending transversely through said lobe portion and adapted to seat in a respective one of said recesses, the said lip portions being adapted to engage and mask said finish portion in said closed position and to support said container thereby, said jaws being pivotally movable about the axis of said pins between a radially outward open position and a radially inward closed position, and said jaws being shaped so as to form a substantially closed annulus about said finish portion to mask the latter from application of a coating to said container, an annular sleeve vertically shiftable on said spindle and operative to engage and cam said jaws to said closed position, said jaws being so mounted on said pivot pins as to be biased by the force of gravity from said open position toward said closed position, a track defining a fixed predetermined path, means for mounting said housing on said track and for driving said chuck assembly along said track and path, a movable lift assembly adapted to move in synchronization with said chuck assembly over at least a portion of said path comprising a shaft mounted vertically for reciprocation within a concentric casing, first fork means attached to said shaft, extending therefrom, and engageable around said annular sleeve to move said sleeve into and out of engagement with said jaws, second fork means attached to said casing, extending therefrom, and engageable around said spindle to maintain said lift assembly in synchronization with the movement of said chuck assembly, means for driving said lift assembly, means disposed at least adjacent a path defined by said spindles, as the chuck assembly moves along said track, for spinning the spindles, chuck body, and jaws to bias said jaws toward their open position, and cam means disposed at least adjacent said fixed predetermined path for releasing said container from said jaws at a predetermined position.

19. Apparatus for supporting a container in a vertical position by a finish portion thereof comprising, in combination;

a chuck assembly including, a spindle, means for vertically mounting a spindle, a chuck body carried by the spindle, a plurality of chuck jaws mounted by said body and extending therebelow, said jaws being pivotally movable between a radially outward open position and a radially inward closed position, said jaws being so shaped that when in closed position they form a substantially closed annulus about said finish portion, an annular sleeve vertically shiftable along said spindle and operative to engage and hold said jaws in said closed position, said jaws each including a lip portion adapted to engage said finish portion when in said closed position and to support said container thereby, means for shifting said sleeve along said spindle into and out of closing engagement with said jaws, and means for spinning said chuck body so that said jaws pivot outwardly toward said open position when said sleeve is out of engagement therewith.

20. The apparatus of claim 19 wherein the vertically disposed spindle is mounted at an upper end for rotation in a housing and wherein said chuck body is attached to a lower end of said spindle.

21. The apparatus of claim 19 wherein said housing is mounted on an elongated track to move said chuck assembly through a path defined by the track and further comprising flexible means disposed at least partially in a portion of said path for engaging said spindle and for spinning said spindle, chuck body and jaws as the assembly is moved along said path, said jaws being biased toward the open position by said spinning.

* * * * *

UNITED STATES PATENT OFFICE
CERTIFICATE OF CORRECTION

PATENT NO. : 3,894,630
DATED : July 15, 1975
INVENTOR(S) : Herbert C. Shank, Jr.

It is certified that error appears in the above-identified patent and that said Letters Patent are hereby corrected as shown below:

Column 1, line 37, insert the word --cap-- between the words "metal" and "ultimately".

Column 6, line 1, delete the word "up" and insert the word --upon-- therefor.

Column 6, line 50, delete the word "and" and insert the word --about-- therefor.

Column 8, line 8, delete the word "particles" and insert the word --articles-- therefor.

Column 11, line 17, delete the word "wherein" and insert the word --when-- therefor.

Signed and Sealed this twenty-fourth Day of February 1976

[SEAL]

Attest:

RUTH C. MASON
Attesting Officer

C. MARSHALL DANN
Commissioner of Patents and Trademarks